United States Patent
Nagano et al.

(10) Patent No.: US 11,070,685 B2
(45) Date of Patent: *Jul. 20, 2021

(54) INFORMATION PROCESSING APPARATUS AND INFORMATION PROCESSING METHOD FOR ACQUIRING IMAGE FORMING APPARATUS STATUS TO DISPLAY COMPOSITE IMAGE INDICATING DEVICE IMAGE PARTS AND ERROR IMAGE PARTS

(71) Applicant: KYOCERA DOCUMENT SOLUTIONS INC., Osaka (JP)

(72) Inventors: Daisaku Nagano, Concord, CA (US); Hiroshi Manabe, Concord, CA (US)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/597,879

(22) Filed: Oct. 10, 2019

(65) Prior Publication Data
US 2021/0112167 A1   Apr. 15, 2021

(51) Int. Cl.
*H04N 1/00* (2006.01)
*H04N 1/32* (2006.01)
(Continued)

(52) U.S. Cl.
CPC ..... *H04N 1/00344* (2013.01); *H04N 1/00039* (2013.01); *H04N 1/00058* (2013.01);
(Continued)

(58) Field of Classification Search
None
See application file for complete search history.

(56) References Cited

U.S. PATENT DOCUMENTS 6,721,879 B1 *   4/2004   Tanaka ............... G06F 1/24
                                              713/1
2002/0049839 A1 *   4/2002   Miida ............... G06F 3/1204
                                              709/224

(Continued)

FOREIGN PATENT DOCUMENTS

JP        2017224292 A    12/2017

*Primary Examiner* — Haris Sabah
(74) *Attorney, Agent, or Firm* — Li & Cai Intellectual Property (USA) Office

(57) ABSTRACT

An apparatus includes a device image processor configured to receive the plurality of device image definitions and the plurality of device offset information definitions from the device image module, read, from the device configuration definition, a plurality of device image parts defined by the plurality of received device image definitions, respectively, receive, from the device image module, the device error definition and the error offset information definition, read, from the device configuration definition, an error image part defined by the received device error definition, arrange the plurality of read device image parts on a plurality of offset positions defined by the plurality of received device offset information definitions, respectively, and arrange the read error image part on an offset position defined by the received error offset information definition, to thereby generate a composite image, and cause the software executing module to display the composite image on the display device.

12 Claims, 8 Drawing Sheets

(51) Int. Cl.
*G03G 15/00* (2006.01)
*G03G 15/08* (2006.01)

(52) U.S. Cl.
CPC ....... *H04N 1/00074* (2013.01); *H04N 1/0097* (2013.01); *G03G 15/0863* (2013.01); *G03G 15/502* (2013.01); *G03G 15/553* (2013.01); *G03G 2215/00548* (2013.01); *H04N 1/32539* (2013.01)

(56) References Cited

U.S. PATENT DOCUMENTS

| | | | | |
|---|---|---|---|---|
| 2005/0134893 | A1* | 6/2005 | Han | G06F 11/0733 358/1.14 |
| 2005/0200863 | A1* | 9/2005 | Kiyohara | B41F 33/0009 358/1.7 |
| 2014/0204403 | A1* | 7/2014 | Young | G06F 3/1207 358/1.14 |
| 2016/0318312 | A1* | 11/2016 | Hedberg | H04N 1/00129 |
| 2017/0075743 | A1* | 3/2017 | Zhu | G06F 11/0751 |

\* cited by examiner

INFORMATION PROCESSING APPARATUS AND INFORMATION PROCESSING METHOD FOR ACQUIRING IMAGE FORMING APPARATUS STATUS TO DISPLAY COMPOSITE IMAGE INDICATING DEVICE IMAGE PARTS AND ERROR IMAGE PARTS

FIELD OF THE DISCLOSURE

The present disclosure relates to an information processing apparatus configured to drive and/or manage an image forming apparatus and display an image of the image forming apparatus on a display device. The present disclosure further relates to an information processing method.

BACKGROUND OF THE DISCLOSURE

When an information processing apparatus (personal computer) executes a software program for driving and/or managing an image forming apparatus, the information processing apparatus displays images showing the image forming apparatus and devices attached to the image forming apparatus on a display device.

SUMMARY OF THE DISCLOSURE

According to an embodiment of a present disclosure, there is provided an information processing apparatus, including:
 a communication interface configured to communicate with an image forming apparatus;
 a display device;
 a storage device that stores device configuration definitions including
  a plurality of device image parts indicating the image forming apparatus and one or more devices physically attachable to the image forming apparatus, respectively,
  a plurality of device image definitions defining the plurality of device image parts with respect to a plurality of device identifiers identifying the image forming apparatus and the one or more devices, respectively,
  a plurality of device offset information definitions defining offset amounts with respect to the plurality of device identifiers, respectively, the offset amounts indicating relative positions of the plurality of device image parts, respectively,
  one or more error image parts,
  device error definitions defining, respectively, the one or more error image parts with respect to one or more error identifiers identifying one or more error types, respectively, and
  a plurality of error offset information definitions defining relative positions of the one or more error image parts with respect to the plurality of device image parts, respectively, with respect to the one or more error identifiers and the plurality of device identifiers, respectively; and
 a processor configured to operate as
  a device image processor carried out by a software executing module, the software executing module being configured to execute a software program for driving and/or managing the image forming apparatus on an OS (Operation System),
  a device status processor carried out by the software executing module,
  an analyzer module configured to communicate with the device status processor, and
  a device image module configured to communicate with the device image processor,
 the device status processor being configured to
 receive, from the image forming apparatus, a plurality of device identifiers identifying the image forming apparatus and one or more devices actually attached to the image forming apparatus, respectively, and status information being information of a status of the image forming apparatus, and
 send the plurality of device identifiers and the status information to the analyzer module,
 the analyzer module being configured to
 receive the plurality of device identifiers and the status information from the device status processor,
 analyze the status information to thereby determine an error predicted to occur in one of the image forming apparatus and the one or more devices, and
 send, to the device status processor, an error identifier and an error device identifier, the error identifier identifying the determined error, the error device identifier being a device identifier identifying one of the image forming apparatus and the one or more devices, in which an error is predicted to occur,
 the device status processor being configured to
 receive the error identifier and the error device identifier from the analyzer module, and
 supply the plurality of device identifiers, the error identifier, and the error device identifier to the device image processor,
 the device image processor being configured to
 obtain the plurality of device identifiers, the error identifier, and the error device identifier from the device status processor, and
 send the plurality of obtained device identifiers, the error identifier, and the error device identifier to the device image module,
 the device image module being configured to
 receive the plurality of device identifiers, the error identifier, and the error device identifier from the device image processor,
 read, from the device configuration definition, a plurality of device image definitions defined with respect to the plurality of received device identifiers, respectively,
 read, from the device configuration definition, a plurality of device offset information definitions defined with respect to the plurality of received device identifiers, respectively,
 send, to the device image processor, the plurality of read device image definitions and the plurality of read device offset information definitions,
 read, from the device configuration definition, a device error definition defined with respect to the received error identifier,
 read, from the device configuration definition, an error offset information definition defined with respect to the received error identifier and the received error device identifier, and
 send, to the device image processor, the read device error definition and the read error offset information definition,
 the device image processor being configured to
 receive the plurality of device image definitions and the plurality of device offset information definitions from the device image module, read, from the device configuration definition, a plurality of device image parts defined by the plurality of received device image definitions, respectively, receive, from the device image module, the device error definition and the error offset information definition, read, from the device configuration definition, an error image part defined by the received device error definition, arrange the plurality of read device image parts on a plurality of offset positions defined by the plurality of received device offset information definitions, respectively, and further arrange the read error image part on an offset position defined by the received error offset information definition, to thereby generate a composite image, and cause the software executing module to display the composite image on the display device.

These and other objects, features and advantages of the present disclosure will become more apparent in light of the following detailed description of best mode embodiments thereof, as illustrated in the accompanying drawings.

DETAILED DESCRIPTION OF THE EXEMPLARY EMBODIMENTS

Hereinafter, an embodiment of the present disclosure will be described with reference to the drawings.

1. HARDWARE CONFIGURATION OF INFORMATION PROCESSING APPARATUS

Figure 1:
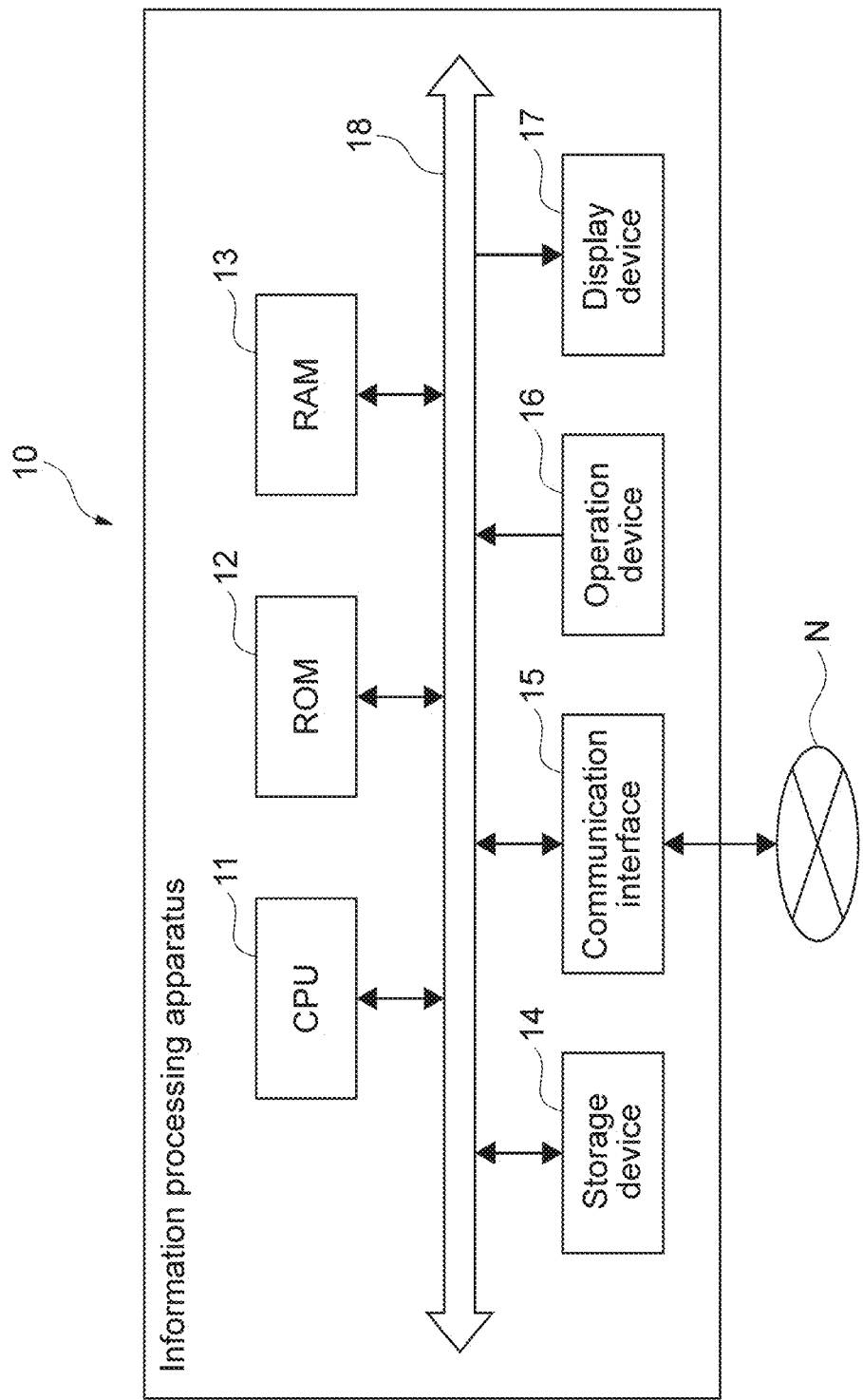
FIG. 1 shows a hardware configuration of an information processing apparatus according to an embodiment of the present disclosure.

FIG. 1 shows a hardware configuration of an information processing apparatus according to an embodiment of the present disclosure.

The information processing apparatus 10 is, typically, a personal computer or a tablet device. The information processing apparatus 10 includes the CPU (Central Processing Unit) 11 (processor), the ROM (Read Only Memory) 12 (memory), the RAM (Random Access Memory) 13, the storage device 14 (memory), the communication interface 15, the operation device 16, the display device 17, and the bus 18 connecting them each other.

The CPU 11 (processor) loads a plurality of information processing programs stored in the ROM 12 (memory) in the RAM 13 and executes the information processing programs. The ROM 12 fixedly stores the programs executed by the CPU 11, data, and the like. The ROM 12 is an example of a non-transitory computer readable recording medium.

The storage device 14 is a large-volume recording medium such as an HDD (Hard Disk Drive) and an SSD (Solid State Drive). The storage device 14 includes an external recording medium such as a USB (Universal Serial Bus) memory.

The operation device 16 includes a touch pad, a keyboard, a mouse, various switches, and the like. The operation device 16 detects operations input by a user, and outputs signals to the CPU 11. The operation device 16 is an embodiment of an input device. The information processing apparatus 10 may include, as an input device, a sound input device such as a microphone.

The display device 17 includes an LCD, an organic EL display, or the like. The display device 17 receives information from the CPU 11, executes computing process on the basis of the received information, and displays generated image signals on a screen. The display device 17 may be an external display device.

The communication interface 15 is an interface for connecting to the network N. The communication interface 15 is capable of communicating with the image forming apparatus 20 the network N such as the Internet or a LAN (Local Area Network).

The image forming apparatus 20 is, typically, an MFP (Multifunction Peripheral) or a production printer. One or more devices (in the present embodiment, a plurality of devices) (paper cassettes, finishers, etc. Not shown.) are physically attachable to the image forming apparatus 20. The "physically attachable devices" are, in other words, physically detachable from the image forming apparatus 20.

2. FUNCTIONAL CONFIGURATION OF INFORMATION PROCESSING APPARATUS

Figure 2:
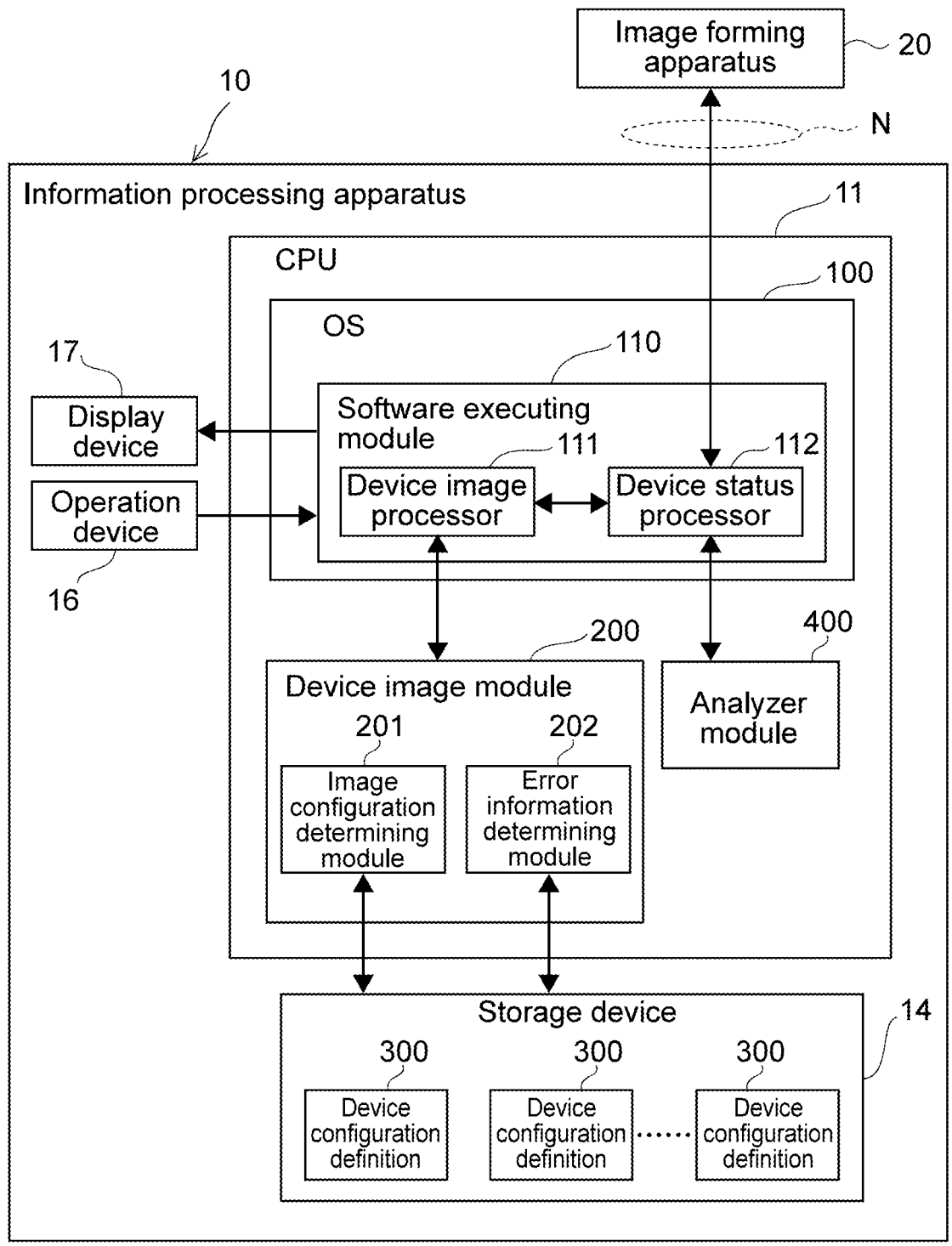
FIG. 2 shows a functional configuration of the information processing apparatus.

FIG. 2 shows a functional configuration of the information processing apparatus.

The CPU 11 of the information processing apparatus 10 executes the OS (Operation System) 100. The OS 100 is a platform such as Windows (registered trademark), Mac (registered trademark), or Linux (registered trademark), for example.

The software executing module 110 executes a software program for driving and/or managing the image forming apparatus 20 on the OS 100. Therefore a software program executed by the software executing module 110 is different according to each type of the OS 100, i.e., depends on the type of the OS 100. An example of the "software program for driving the image forming apparatus 20" is a printer driver. For example, a printer driver is configured to display a menu window image including a plurality of items on the display device 17, determine one item selected via the operation device 16, and cause the image forming apparatus 20 to execute an operation depending on the selected item. An example of the "software program for managing the image forming apparatus 20" is a device manager software. For example, a device manager software program is configured to display, on the display device 17, a window showing properties or errors of the image forming apparatus 20 and a plurality of devices actually attached to the image forming apparatus 20.

The software executing module 110 carries out the device image processor 111 and the device status processor 112 as sub modules. The device image processor 111 and the device status processor 112 are also different according to each type of the OS 100, i.e., depends on the type of the OS 100.

The device status processor 112 receives a plurality of device identifiers and status information from the image forming apparatus 20 via the communication interface 15. The plurality of device identifiers identify the image forming apparatus 20 and a plurality of devices actually attached to the image forming apparatus 20, respectively. The status information is information of the status of the image forming apparatus 20. The "status information" includes, for example, the device configuration, the counter, the statuses of consumable items (for example, toner levels), the error status, and the like.

When the software executing module 110 displays the aforementioned window on the display device 17, the device image processor 111 generates images of the image forming apparatus 20 and the plurality of devices actually attached to the image forming apparatus 20 and an image of an error, which is predicted to occur in one of the image forming apparatus 20 and the plurality of devices, on the basis of information received by the device status processor 112.

The CPU 11 of the information processing apparatus 10 further executes the device image module 200 and the analyzer module 400. The device image module 200 and the analyzer module 400 are common to every type of the OS 100, i.e., are independent of the type of the OS 100.

The analyzer module 400 determines an error, which is predicted to occur in one of the image forming apparatus 20 and the plurality of devices, on the basis of the plurality of device identifiers and the status information received by the device status processor 112 from the image forming apparatus 20.

The device image module 200 supplies, to the device image processor 111, a plurality of image parts that configure images to be displayed on the display device 17 and other information.

The device image module 200 includes the image configuration determining module 201 and the error information determining module 202. The image configuration determining module 201 and the error information determining module 202 determine a plurality of image parts and other information to be supplied to the device image processor 111 with reference to the plurality of device configuration definitions 300 stored in the storage device (the operations will be described later with reference to operational flows).

The storage device 14 stores the plurality of device configuration definitions 300. The plurality of device configuration definitions 300 are in one-to-one association with a plurality of model identifiers, respectively, the plurality of model identifiers identifying a plurality of models of the image forming apparatus 20, respectively. Each device configuration definition 300 is described in XML (Extensible Markup Language).

3. DATA STRUCTURE OF DEVICE CONFIGURATION DEFINITION

Figure 3:
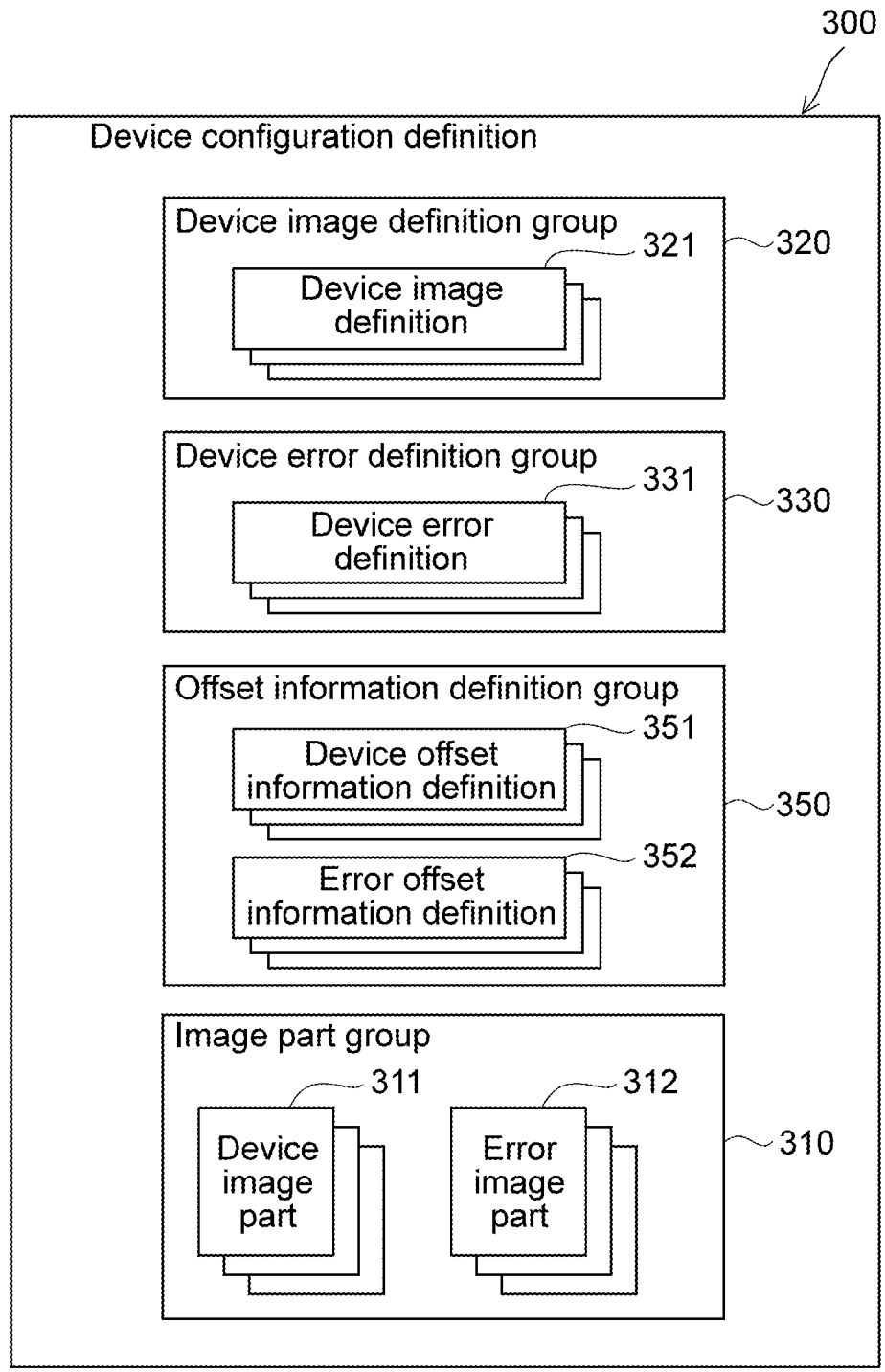
FIG. 3 shows a data structure of a device configuration definition.

FIG. 3 shows a data structure of a device configuration definition.

One device configuration definition 300 will be described. One device configuration definition 300 is stored in the storage device 14 in association with a model identifier identifying one specific model of the image forming apparatus 20. The device configuration definition 300 includes the image part group 310, the device image definition group 320, the device error definition group 330, and the offset information definition group 350.

The image part group 310 includes the plurality of device image parts 311 and the one or more error image parts 312 (in the present embodiment, the plurality of error image parts 312). Those image parts 311 and 312 are, for example, PNG (Portable Network Graphics) images.

Figure 4:
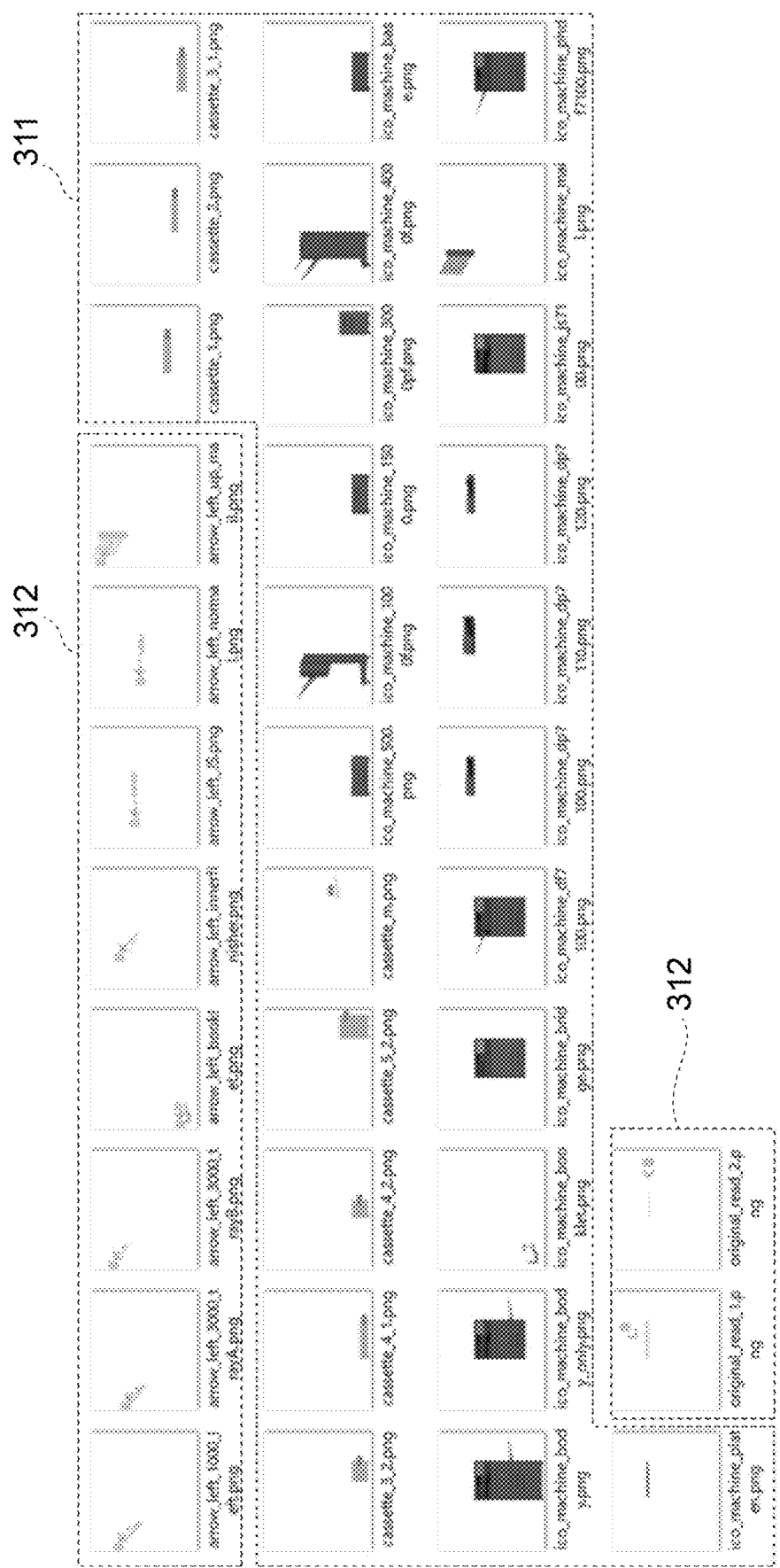
FIG. 4 shows examples of a plurality of device image parts and a plurality of error image parts.

FIG. 4 shows examples of a plurality of device image parts and a plurality of error image parts.

The plurality of device image parts 311 show the image forming apparatus 20 and a plurality of devices physically attachable to the image forming apparatus 20, respectively. In the examples of FIG. 4, the plurality of device image parts 311 are images showing bodies of the image forming apparatus 20, paper cassettes, a platen, a booklet, a bridge, a base, mail boxes, and the like, respectively. A plurality of different device image parts 311 may be prepared for one device. For example, there may be prepared a device image part 311 showing a status where one paper cassette is closed and another device image part 311 showing a status where the same paper cassette is open.

The plurality of error image parts 312 show errors (errors which are predicted to occur, and occurred errors), respectively. In the examples of FIG. 4, the plurality of error image parts 312 include arrows in different directions, and images of icons showing combinations of devices and arrows, respectively. The plurality of error image parts 312 may further include images of icons showing marks each including a combination of an object showing a trouble or an alert, a symbol, and a color (red, yellow, etc.). The plurality of error image parts 312 may further include texts (messages) indicating troubles or alerts. Further, for example, with respect to one paper cassette, one device image part 311 showing a status where one paper cassette is closed may be used as a device image part 311 showing the normal status. Meanwhile, another device image part 311 showing a status where the same paper cassette is open may be used as an error image part 312.

The device image definition group 320 includes the plurality of device image definitions 321. The plurality of device image definitions 321 define the plurality of device image parts 311 with respect to a plurality of device identifiers, respectively, the plurality of device identifiers identifying the image forming apparatus 20 and the plurality of devices, respectively. Specifically, the device image definition 321 is information for making a device identifier, which identifies the image forming apparatus 20 or a device, and a device image part 311 in association with each other. More specifically, the device image definition 321 defines, for example, an image file name of one device image part 311 with respect to one device identifier.

The device error definition group 330 includes the plurality of device error definitions 331. The plurality of device error definitions 331 define the plurality of error image parts 312 with respect to one or more error identifiers, respectively, the one or more error identifiers identifying a plurality of error types, respectively. Specifically, the device error definition 331 is information making an error identifier (for example, error code) identifying a type of an error, which is predicted to occur, or an error, which actually occurred, in the image forming apparatus 20 or a device, and an error image part 312 in association with each other. More specifically, the device error definition 331 defines, for example, one error image part 312 with respect to one error identifier (for example, error code).

The offset information definition group 350 includes the plurality of device offset information definitions 351 and the plurality of error offset information definitions 352.

The plurality of device offset information definitions 351 define offset amounts with respect to the plurality of device identifiers, respectively, the offset amounts indicating relative positions of the plurality of device image parts 311, respectively. Specific examples of the "offset amounts" will be described. For example, a predetermined position of the device image part 311 showing the body of the image forming apparatus 20 is treated as the origin of the XY coordinate. The "predetermined position" may be, for example, the center point, the left-top corner point, or the like of the device image part 311. In order to composite the device image part 311 showing the body of the image forming apparatus 20 and the device image part 311 of the paper cassette actually attached to the image forming apparatus 20 and display the composite image on the display device 17, the device image part 311 of the paper cassette is offset with respect to the center of the device image part 311 showing the body of the image forming apparatus 20 by a certain amount (XY value). The offset amount means this amount (XY value).

The plurality of error offset information definitions 352 define relative positions of the plurality of error image parts 312 with respect to the plurality of device image parts 311, respectively, with respect to combinations of a plurality of error identifiers and a plurality of device identifiers, respectively. A specific example will be described. For example, with respect to a combination of an error identifier identifying an error "paper jam" and a device identifier identifying a device "paper cassette", the error image part 312 is offset with respect to the center of the device image part 311 of the body of the image forming apparatus 20. At this time, the offset amount may be, for example, approximately the same as the amount (XY value) by which the device image part 311 of the paper cassette is offset with respect to the center of the device image part 311 showing the body of the image forming apparatus 20. As a result, the error image part 312 is displayed on the device image part 311 of the paper cassette (i.e., location in which error occurs).

4. OPERATION OF INFORMATION PROCESSING APPARATUS

Figure 5:
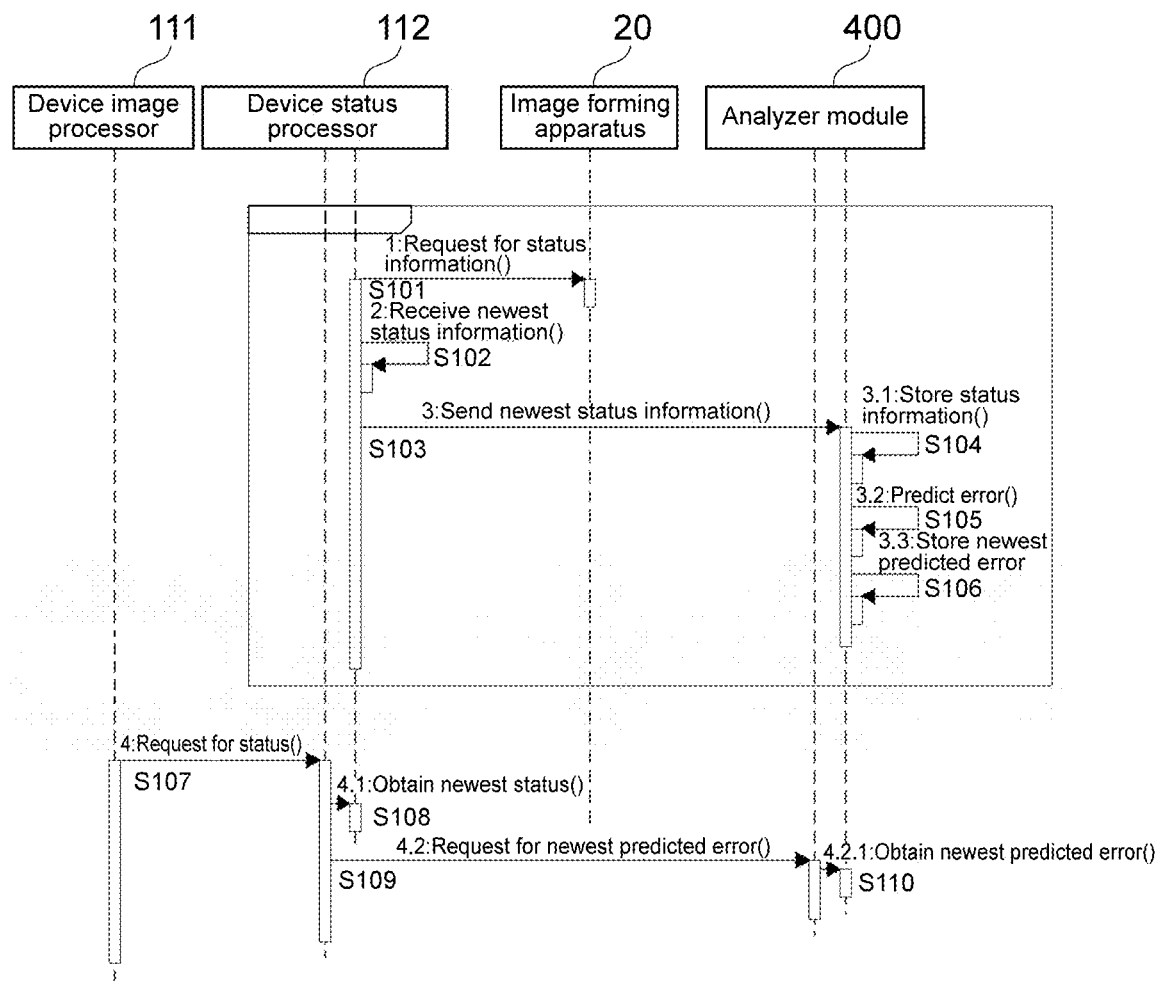
FIG. 5 shows a partial operational sequence of the information processing apparatus.
Figure 6:
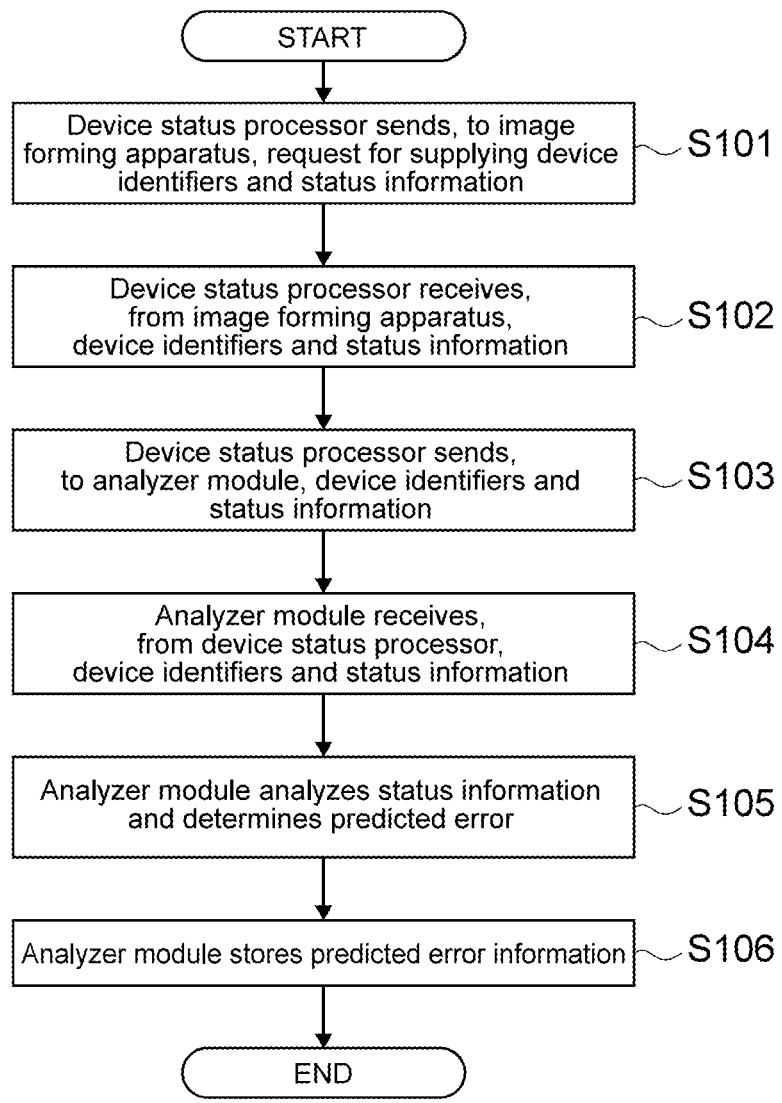
FIG. 6 shows a first operational flow of the information processing apparatus.

FIG. 5 shows a partial operational sequence of the information processing apparatus. FIG. 6 shows a first operational flow of the information processing apparatus.

The device status processor 112, for example, periodically (every five minutes, etc.), sends, to the image forming apparatus 20 being driven and/or managed, via the network N, a request for supplying a model identifier identifying a model of the image forming apparatus 20, a plurality of device identifiers identifying a plurality of devices actually attached to the image forming apparatus 20, respectively, and status information being information of a status of the image forming apparatus 20 (Step S101). The device status processor 112 receives, from the image forming apparatus 20 via the network N, a model identifier, a plurality of device identifiers, and status information, and stores the model identifier, the plurality of device identifiers, and the status information (Step S102). For example, communication between the device status processor 112 and the image forming apparatus 20 may be carried out by SNMP (Simple Network Management Protocol) and SOAP (Simple Object Access Protocol). Alternatively, if the information processing apparatus 10 is connected to the image forming apparatus 20 not via the network N (e.g., connected via USB), communication between the device status processor 112 and the image forming apparatus 20 may be carried out by, for example, PJL (Printer Job Language). The device status processor 112 sends, to the analyzer module 400, the received model identifier, the plurality of received device identifiers, and the received status information (Step S103).

The analyzer module 400 receives the model identifier, the plurality of device identifiers, and the status information from the device status processor 112, and stores them in a local or external storage device (Step S104). The analyzer module 400 analyzes the status information, and determines an error, which is predicted to occur in one of the image forming apparatus 20 and the plurality of devices (Step S105). For example, the analyzer module 400 analyzes the toner level, which is stored status information, to thereby determine a predicted error and the time, at which the error is predicted to occur, i.e., the cyan toner will be empty after 13 days. The analyzer module 400 stores information about the predicted error in a local or external storage device (Step S106). The "information about the predicted error" includes an error identifier identifying the determined error, an error device identifier, which is a device identifier identifying one of the image forming apparatus 20 and one or more devices in which the error is predicted to occur, information indicating the time at which the error is predicted to occur (time information), and the like.

Figure 7:
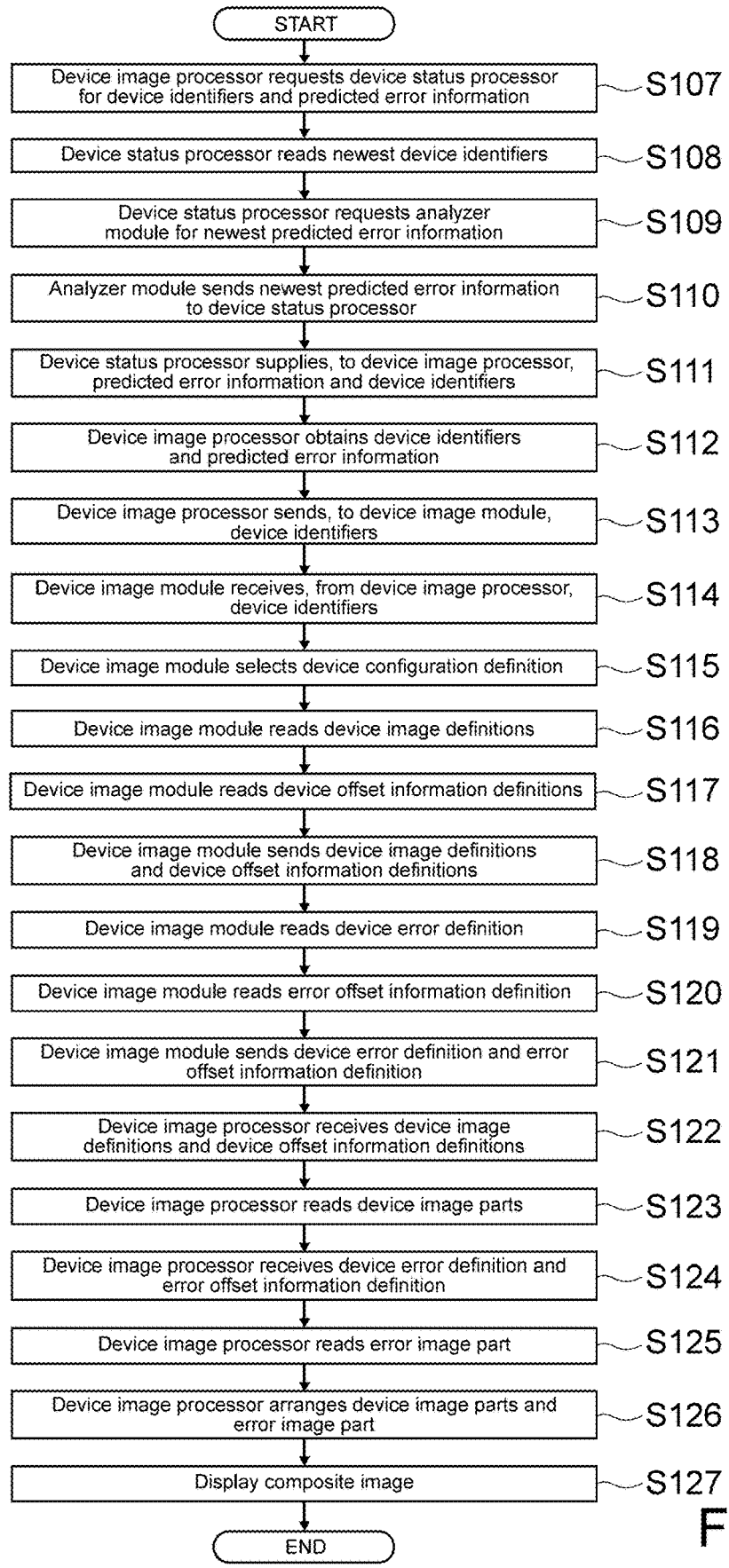
FIG. 7 shows a second operational flow of the information processing apparatus.

FIG. 7 shows a second operational flow of the information processing apparatus.

The device image processor 111 requests the device status processor 112 for the model identifier and the plurality of device identifiers received from the image forming apparatus 20 and the predicted error information stored by the analyzer module 400 (Step S107).

The device status processor 112 receives the request from the device image processor 111. The device status processor 112 reads the newest model identifier and plurality of device identifiers (Step S108), which are received from the image forming apparatus 20 and stored (Step S102). The device status processor 112 requests the analyzer module 400 for the newest predicted error information (Step S109).

The analyzer module 400 receives the request, and then reads and sends, to the device status processor 112, the newest predicted error information (Step S106) (Step S110).

The device status processor 112 receives the newest predicted error information (including error identifier, error device identifier, time information, and the like) from the analyzer module 400. The device status processor 112 supplies the newest predicted error information (including error identifier, error device identifier, time information, and the like) received from the analyzer module 400 and the model identifier and the plurality of device identifiers received from the image forming apparatus 20 to the device image processor 111 (Step S111).

The device image processor 111 obtains the model identifier and the plurality of device identifiers received from the image forming apparatus 20 by the device status processor 112 and the newest predicted error information (including error identifier, error device identifier, time information, and the like) of the analyzer module 400 (Step S112). The device image processor 111 sends the model identifier and the plurality of device identifiers to the device image module 200 (Step S113). For example, the device image processor 111 may send, to the device image module 200, the model identifier and the plurality of device identifiers by using an initialization function (JSON (JavaScript Object Notation)).

The device image module 200 receives the model identifier, the plurality of device identifiers, the error identifier, and the error device identifier from the device image processor 111 (Step S114). The image configuration determining module 201 of the device image module 200 selects the one device configuration definition 300 in association with the received model identifier (Step S115). The image configuration determining module 201 reads, from the device image definition group 320 of the selected device configuration definition 300, the plurality of device image definitions 321 defined with respect to the plurality of received device identifiers, respectively (Step S116). The image configuration determining module 201 reads, from the offset information definition group 350 of the device configuration definition 300, the plurality of device offset information definitions 351 defined with respect to the plurality of device identifiers, respectively (Step S117). The device image module 200 sends, to the device image processor 111, the plurality of device image definitions 321 and the plurality of device offset information definitions 351 read by the image configuration determining module 201 (Step S118).

The error information determining module 202 of the device image module 200 reads, from the device error definition group 330 of the device configuration definition 300, the device error definition 331 defined with respect to the received (Step S114) error identifier (Step S119). The error information determining module 202 reads, from the offset information definition group 350 of the device configuration definition 300, the error offset information definition 352 defined with respect to the combination of the received error identifier and the received device identifier (Step S120). The device image module 200 sends, to the device image processor 111, the device error definition 331 and the error offset information definition 352 read by the error information determining module 202 (Step S121).

The device image processor 111 receives, from the device image module 200, the plurality of device image definitions 321 and the plurality of device offset information definitions 351 (Step S122). The device image processor 111 reads, from the image part group 310 of the device configuration definition 300, the plurality of device image parts 311 defined by the plurality of received device image definitions 321, respectively (Step S123).

The device image processor 111 receives the device error definition 331 and the error offset information definition 352 from the device image module 200 (Step S124). The device image processor 111 reads, from the image part group 310 of the device configuration definition 300, the error image part 312 defined by the received device error definition 331 (Step S125).

The device image processor 111 arranges the plurality of read device image parts 311 on a plurality of offset positions defined by the plurality of received device offset information definitions 351, respectively. The device image processor 111 further arranges the read error image part 312 on the offset position defined by the received error offset information definition 352. As a result, the device image processor 111 generates a composite image including the plurality of device image parts 311 and the error image part 312 (Step S126).

The device image processor 111 causes the software executing module 110 to display the generated composite image on the display device 17 (Step S127).

Figure 8:
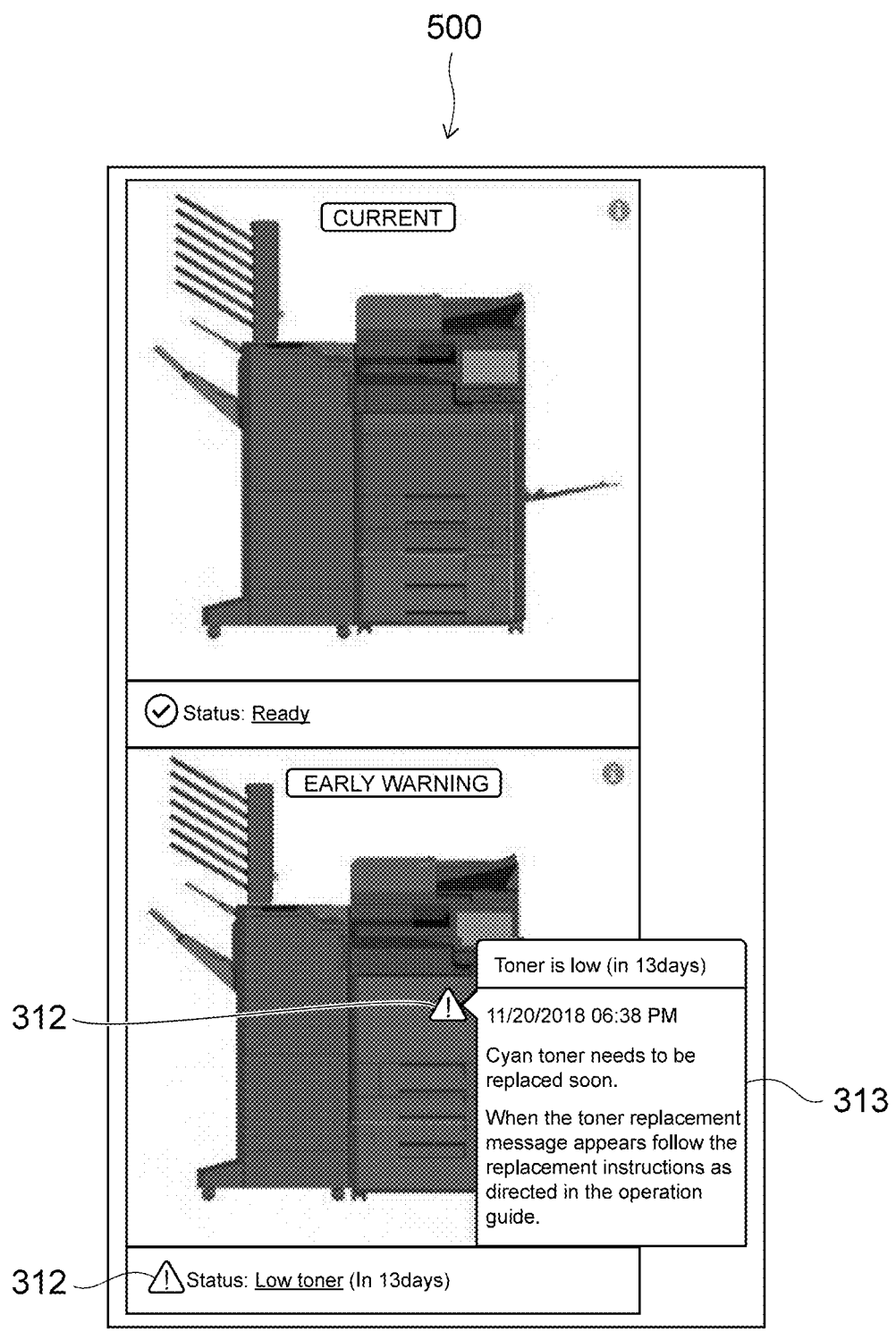
FIG. 8 shows examples of composite images.

FIG. 8 shows examples of composite images.

The composite image 500 includes the plurality of error image parts 312. The plurality of error image parts 312 include images of icons showing marks each including a combination of an object showing a trouble or an alert, a symbol, and color (red, yellow, etc.).

The composite image 500 further includes the text information 313 indicating the predicted error and the time, at which the error is predicted to occur, i.e., the cyan toner will be empty after 13 days, determined by the analyzer module 400 (Step S106).

5. MODIFICATION EXAMPLES

The device image processor 111 is configured to determine whether or not a difference between the time at which the error is predicted to occur and a current time is equal to or larger than a first threshold (for example, 10 days, 5 days, etc.) on a basis of the time information determined by the analyzer module 400 (Step S106). The device image processor 111 is configured to generate one composite image in a case where it is determined that the difference is equal to or larger than the first threshold, and generate another composite image different from the one composite image in a case where it is determined that the difference is smaller than the first threshold. For example, the device image processor 111 may generate a composite image including small font texts in a case where the difference between the time at which the error is predicted to occur and the current time is equal to or larger than the first threshold (for example, 10 days). The device image processor 111 may generate a composite image including large font texts in a case where the difference is smaller than the first threshold (for example, 10 days). For example, the device image processor 111 may generate a composite image including a still text image in a case where the difference between the time at which the error is predicted to occur and the current time is equal to or larger than the first threshold (for example, 5 days). The device image processor 111 may generate a composite image including a composite image including blinking texts in a case where the difference is smaller than the first threshold (for example, 5 days). In short, the device image processor 111 may generate a composite image including a highlighted expression in a case where it is determined that the difference is smaller than the first threshold.

The analyzer module 400 is configured to analyze the status information received by the device status processor 112 from the image forming apparatus 20 (Step S102) to thereby determine that a cause of the error, which is predicted to occur in one of the image forming apparatus 20 and the one or more devices, is solved (for example, new toner is attached), and then send, to the device status processor 112, error solved information indicating that a cause of the error is solved. The device status processor 112 is configured to receive the error solved information from the analyzer module 400, and supply the error solved information to the device image processor 111. The device image processor 111 is configured to obtain the error solved information from the device status processor 112, then delete or change the error image part of the composite image to thereby update the composite image, and cause the software executing module 110 to display the updated composite image on the display device 17. An example of changing an error image part is, for example, to display an image part or texts indicating that a toner is exchanged in a composite image by the device image processor 111.

The analyzer module 400 is configured to analyze the status information received by the device status processor 112 from the image forming apparatus 20 (Step S102) to thereby determine that the error occurred (for example, toner is not exchanged and is empty) in one of the image forming apparatus 20 and the one or more devices, and send, to the device status processor 112, error generated information indicating that the error occurred. The device status processor 112 is configured to receive the error generated information from the analyzer module 400, and supply the error generated information to the device image processor 111. The device image processor 111 is configured to obtain the error generated information from the device status processor 112, then read, from the device configuration definition, a different error image part defined by the device error definition received from the device image module 111, arrange the read different error image part on the offset position to thereby update the composite image, and cause the software executing module 110 to display the updated composite image on the display device 17. For example, the device image processor 111 may, as a different error image part, display an error image part of a symbol of a different color, or display an error message.

The analyzer module 400 may be configured to make timings of determination of an error, which is predicted to occur in one of the image forming apparatus 20 and the one or more devices, different depending on a past time period from display of the composite image including the error image to solution of a cause of the error. For example, if a past time period from display of a composite image including an error image to solution of a cause of the error is equal to or larger than a threshold (for example, several days to several weeks) (in short, if a user cope with the predicted error very late), the analyzer module 400 may determine a predicted error at an early timing (Step S105). For example, the analyzer module 400 may analyze a toner level, which is stored status information, to thereby determine a predicted error and the time, at which the error is predicted to occur, i.e., the toner will be empty after 20 days (value larger than value determined usually). Further, if a time period from display of a composite image including an error image to solution of a cause of the error is equal to or larger than a threshold (in short, if a user cope with the predicted error very late), the device image processor 111 may generate a composite image including highlighted expression. Further, the analyzer module 400 may make thresholds different from each other depending on different errors of a single image forming apparatus 20. For example, if a drum was exchanged relatively early in the past, the analyzer module 400 may determine a predicted error (drum trouble) at a relatively late timing. If a toner was exchanged relatively late in the past, the analyzer module 400 may determine a predicted error (toner empty) at a relatively early timing.

The analyzer module 400 is configured to determine an error, which is predicted to occur in one of the image forming apparatus 20 and the one or more devices, then send, to an external device (not shown) stored in association with the image forming apparatus 20 in the storage device 14, notification of prediction of the error via the communication interface 15, and supply, to the device status processor 112, error prediction notification information being information indicating that the notification of the prediction of the error is sent. The device status processor 112 is configured to receive the error prediction notification information from the analyzer module 400, and supply the error prediction notification information to the device image processor 111. The device image processor 111 is configured to obtain the error solved information from the device status processor 112, then delete or change the error image part of the composite image to thereby update the composite image, and cause the software executing module 110 to display the updated composite image on the display device 17. For example, the analyzer module 400 may send a notification of prediction of an error to an external device (for example, terminal device that a dealer uses). According to an example of changing an error image part, for example, the device image processor 111 may display an image part or texts indicating that a notification of prediction of an error been sent in a composite image.

5. CONCLUSION

Typically, when an information processing apparatus executes a software program for driving and/or managing an image forming apparatus, the information processing apparatus displays images showing the image forming apparatus and devices actually attached to the image forming apparatus on a display device. When executing a software program for driving an image forming apparatus (for example, printer driver), an information processing apparatus displays the model of the image forming apparatus and the devices optionally attached to the image forming apparatus. When executing a software program for managing an image forming apparatus (for example, device manager software), an information processing apparatus displays a part of the image forming apparatus, in which an error occurs, as follows. For example, a cassette or a door in an open status is displayed, an error icon is displayed, a highlighted item is displayed, or the like. Those images are different depending on not only models of image forming apparatuses but also devices optionally attached to an image forming apparatus.

In order to display the image, therefore, the information processing apparatus determines the model of the image forming apparatus and the devices optionally attached to the image forming apparatus, and generates images of the determined image forming apparatus and devices. Further, in order to display an error, it is necessary for the information processing apparatus to generate different images by highlighting different error parts depending on different models, or to generate different images of devices (paper cassettes, doors, etc.) depending on optionally attached devices. In other words, it is necessary for the information processing apparatus to generate a large number of combinations of images.

In order to generate a large number of combinations of images, according to a conceivable method, for example, a rendering part in Windows (registered trademark) and a data part storing text information necessary to image processing depending on models are configured by using Open GL (Open Graphics Library). According to this method, text information indicating the XYZ positions of every image part information is generated, and a rendering processor module renders every image part. As a result, the rendering processor module renders a 3D animation image. Meanwhile, it is necessary to generate a large number of part information and error information for respective models of image forming apparatuses and respective devices attachable to an image forming apparatus. Because of this, work burdens may be large in order to support new models of image forming apparatuses or new models of devices.

Further, the process of rendering images in RC (Rendering context) by using Open GL and displaying the images on a display (i.e., in association with HDC (Device Context Handle) dedicated to Windows (registered trademark)) is executable only in Windows (registered trademark). However, it is desirable that such process be executable irrespective of differences of platforms such as browsers other than Internet Explorer (registered trademark) and OSs such as Mac (registered trademark) or Linux (registered trademark).

In addition, to a large-size production printer, a larger number of various types of devices are attachable than devices attachable to an MFP. In view of the above, the rendering process may be more and more complicated in the aforementioned method using Open GL.

To the contrary, according to the present embodiment, the information processing apparatus 10 does not define part information necessary to render an image for every device, and does not render the image by a rendering processor module. Instead, according to the present embodiment, the information processing apparatus 10 stores the image parts 311 and 312 in the device configuration definition 300 in association with each model of the image forming apparatus 20. Each of the image parts 311 and 312 is a PNG image prepared for each device, which is physically detachable to the image forming apparatus 20 by user. Further, the information processing apparatus 10 stores the plurality of offset information definitions 351 and 352 of the image parts 311 and 312 in the device configuration definition 300 in association with each model of the image forming apparatus 20.

According to this configuration, depending on the devices actually and physically attached to the image forming apparatus 20 and depending on an error that occurs in the image forming apparatus 20 or a device, the device image module 200 reads the definitions 321 and 331 of the necessary image parts 311 and 312, and reads the corresponding offset information definitions 351 and 352. Then the device image processor 111 arranges, on the basis of the read offset information definitions 351 and 352, the image parts 311 and 312 read on the basis of the definitions 321 and 331. As a result, irrespective of the types and the number of devices actually and physically attached to the image forming apparatus 20 (i.e., even if a large number of devices are attached), it is possible to generate, update, and display composite images without a need of complicated rendering process.

Further, according to the present embodiment, the device image processor 111 depends on the OS 100 and, meanwhile, the device image module 200 is independent of the OS 100. The device image module 200, which is independent of the OS 100, stores the image parts 311 and 312, reads the definitions 321 and 331 of the image parts 311 and 312, and reads the corresponding offset information definitions 351 and 352. Then the OS 100, which depends on the device image processor 111, arranges, on the basis of the read offset information definitions 351 and 352, the image parts 311 and 312 read on the basis of the definitions 321 and 331. As a result, irrespective of the type of the OS 100, it is possible to generate, update, and display composite images reliably on every platform.

According to a conceivable technology, after an error occurs, an image showing an error occurred in one of the image forming apparatus 20 and a plurality of devices actually attached to the image forming apparatus 20 is displayed on the image forming apparatus 20. According to this method, a dealer or an end user copes with the error only after the error occurs actually. As a result, the dealer or the end user may, only after the error occurs, notice the necessity of replacement of a consumable item or a part, order the consumable item or the part, and replace the consumable item or the part. In this case, there arises a downtime in which one of the image forming apparatus 20 and the plurality of devices actually attached to the image forming apparatus 20 cannot be used. To the contrary, according to the present embodiment, before an error occurs, an image showing an error, which is predicted to occur in one of the image forming apparatus 20 and the plurality of devices, is displayed on the image forming apparatus 20. As a result, a dealer or an end user may cope with (for example, by exchanging a toner) a situation, in which an error is yet to occur actually. As a result, the downtime may be eliminated or reduced.

It should be understood by those skilled in the art that various modifications, combinations, sub-combinations and alterations may occur depending on design requirements and other factors insofar as they are within the scope of the appended claims or the equivalents thereof

What is claimed is:

1. An information processing apparatus, comprising:
a communication interface configured to communicate with an image forming apparatus;
a display device;
a storage device that stores device configuration definitions including a plurality of device image parts indicating the image forming apparatus and one or more devices physically attachable to the image forming apparatus, respectively,
a plurality of device image definitions defining the plurality of device image parts with respect to a plurality of device identifiers identifying the image forming apparatus and the one or more devices, respectively,
a plurality of device offset information definitions defining offset amounts with respect to the plurality of device identifiers, respectively, the offset amounts indicating relative positions of the plurality of device image parts, respectively,
one or more error image parts,
device error definitions defining, respectively, the one or more error image parts with respect to one or more error identifiers identifying one or more error types, respectively, and
a plurality of error offset information definitions defining relative positions of the one or more error image parts with respect to the plurality of device image parts, respectively, with respect to the one or more error identifiers and the plurality of device identifiers, respectively; and
a processor configured to operate as
a device image processor carried out by a software executing module, the software executing module being configured to execute a software program for driving and/or managing the image forming apparatus on an OS (Operation System),
a device status processor carried out by the software executing module,
an analyzer module configured to communicate with the device status processor, and
a device image module configured to communicate with the device image processor,
the device status processor being configured to
receive, from the image forming apparatus, a plurality of device identifiers identifying the image forming apparatus and one or more devices actually attached to the image forming apparatus, respectively, and status information being information of a status of the image forming apparatus, and
send the plurality of device identifiers and the status information to the analyzer module,
the analyzer module being configured to
receive the plurality of device identifiers and the status information from the device status processor,
analyze the status information to thereby determine an error predicted to occur in one of the image forming apparatus and the one or more devices, and
send, to the device status processor, an error identifier and an error device identifier, the error identifier identifying the determined error, the error device identifier being a device identifier identifying one of the image forming apparatus and the one or more devices, in which an error is predicted to occur,
the device status processor being configured to receive the error identifier and the error device identifier from the analyzer module, and
supply the plurality of device identifiers, the error identifier, and the error device identifier to the device image processor,
the device image processor being configured to
obtain the plurality of device identifiers, the error identifier, and the error device identifier from the device status processor, and
send the plurality of obtained device identifiers, the error identifier, and the error device identifier to the device image module,
the device image module being configured to
receive the plurality of device identifiers, the error identifier, and the error device identifier from the device image processor,
read, from the device configuration definition, a plurality of device image definitions defined with respect to the plurality of received device identifiers, respectively,
read, from the device configuration definition, a plurality of device offset information definitions defined with respect to the plurality of received device identifiers, respectively,
send, to the device image processor, the plurality of read device image definitions and the plurality of read device offset information definitions,
read, from the device configuration definition, a device error definition defined with respect to the received error identifier,
read, from the device configuration definition, an error offset information definition defined with respect to the received error identifier and the received error device identifier, and
send, to the device image processor, the read device error definition and the read error offset information definition,
the device image processor being configured to
receive the plurality of device image definitions and the plurality of device offset information definitions from the device image module,
read, from the device configuration definition, a plurality of device image parts defined by the plurality of received device image definitions, respectively,
receive, from the device image module, the device error definition and the error offset information definition,
read, from the device configuration definition, an error image part defined by the received device error definition,
arrange the plurality of read device image parts on a plurality of offset positions defined by the plurality of received device offset information definitions, respectively, and further arrange the read error image part on an offset position defined by the received error offset information definition, to thereby generate a composite image, and
cause the software executing module to display the composite image on the display device;
wherein the analyzer module is configured to analyze the status information to thereby determine a time at which the error is predicted to occur, and supply time information to the device status processor, the time information being information indicating the determined time, the device status processor is configured to receive the time information from the analyzer module, and supply the time information to the device image processor, and the device image processor is configured to obtain the time information from the device status processor, and generate the composite image including the time information;
wherein the device image processor is configured to determine whether or not a difference between the time at which the error is predicted to occur and a current time is equal to or larger than a first threshold on a basis of the time information, and generate one composite image in a case where it is determined that the difference is egual to or larger than the first threshold, and generate another composite image different from the one composite image in a case where it is determined that the difference is smaller than the first threshold.

2. The information processing apparatus according to claim 1, wherein
the analyzer module is configured to
analyze the status information to thereby determine that a cause of the error, which is predicted to occur in one of the image forming apparatus and the one or more devices, is solved, and
send, to the device status processor, error solved information indicating that a cause of the error is solved,
the device status processor is configured to
receive the error solved information from the analyzer module, and
supply the error solved information to the device image processor, and
the device image processor is configured to
obtain the error solved information from the device status processor, then
delete or change the error image part of the composite image to thereby update the composite image, and
cause the software executing module to display the updated composite image on the display device.

3. The information processing apparatus according to claim 1, wherein
the analyzer module is configured to
analyze the status information to thereby determine that the error occurred in one of the image forming apparatus and the one or more devices, and
send, to the device status processor, error generated information indicating that the error occurred,
the device status processor is configured to
receive the error generated information from the analyzer module, and
supply the error generated information to the device image processor, and
the device image processor is configured to
obtain the error generated information from the device status processor, then
read, from the device configuration definition, a different error image part defined by the device error definition received from the device image module,
arrange the read different error image part on the offset position to thereby update the composite image, and
cause the software executing module to display the updated composite image on the display device.

4. The information processing apparatus according to claim 1, wherein
the analyzer module is configured to
make timings of determination of an error, which is predicted to occur in one of the image forming apparatus and the one or more devices, different depending on a past time period from display of the composite image including the error image to solution of a cause of the error.

5. The information processing apparatus according to claim 1, wherein
the analyzer module is configured to
determine an error, which is predicted to occur in one of the image forming apparatus and the one or more devices, then
send, to an external device stored in association with the image forming apparatus in the storage device, notification of prediction of the error via the communication interface, and
supply, to the device status processor, error prediction notification information being information indicating that the notification of the prediction of the error is sent,
the device status processor is configured to
receive the error prediction notification information from the analyzer module, and
supply the error prediction notification information to the device image processor, and
the device image processor is configured to
obtain the error solved information from the device status processor, then
delete or change the error image part of the composite image to thereby update the composite image, and
cause the software executing module to display the updated composite image on the display device.

6. The information processing apparatus according to claim 1, wherein
the storage device is configured to store the plurality of device configuration definitions,
the plurality of device configuration definitions are in one-to-one association with a plurality of model identifiers, respectively, the plurality of model identifiers identifying a plurality of models of an image forming apparatus,
the device image processor is configured to
obtain a model identifier identifying a model of the image forming apparatus as a device identifier identifying the image forming apparatus received from the image forming apparatus by the software executing module, and
send the obtained model identifier to the device image module, and
the device image module is configured to
receive the model identifier from the device image processor, and
use a device configuration definition in association with the model identifier.

7. An information processing method executable by an information processing apparatus including
a communication interface configured to communicate with an image forming apparatus,
a display device,
a storage device that stores device configuration definitions including
a plurality of device image parts indicating the image forming apparatus and one or more devices physically attachable to the image forming apparatus, respectively,
a plurality of device image definitions defining the plurality of device image parts with respect to a plurality of device identifiers identifying the image forming apparatus and the one or more devices, respectively,
a plurality of device offset information definitions defining offset amounts with respect to the plurality of device identifiers, respectively, the offset amounts indicating relative positions of the plurality of device image parts, respectively,
one or more error image parts,
device error definitions defining, respectively, the one or more error image parts with respect to one or more error identifiers identifying one or more error types, respectively, and
a plurality of error offset information definitions defining relative positions of the one or more error image parts with respect to the plurality of device image parts, respectively, with respect to the one or more error identifiers and the plurality of device identifiers, respectively, and
a processor configured to operate as
a device image processor carried out by a software executing module, the software executing module being configured to execute a software program for driving and/or managing the image forming apparatus on an OS (Operation System),
a device status processor carried out by the software executing module,
an analyzer module configured to communicate with the device status processor, and
a device image module configured to communicate with the device image processor,
the information processing method comprising:
by the device status processor,
receiving, from the image forming apparatus, a plurality of device identifiers identifying the image forming apparatus and one or more devices actually attached to the image forming apparatus, respectively, and status information being information of a status of the image forming apparatus, and
sending the plurality of device identifiers and the status information to the analyzer module;
by the analyzer module,
receiving the plurality of device identifiers and the status information from the device status processor,
analyzing the status information to thereby determine an error predicted to occur in one of the image forming apparatus and the one or more devices, and
sending, to the device status processor, an error identifier and an error device identifier, the error identifier identifying the determined error, the error device identifier being a device identifier identifying one of the image forming apparatus and the one or more devices, in which an error is predicted to occur;
by the device status processor,
receiving the error identifier and the error device identifier from the analyzer module, and
supplying the plurality of device identifiers, the error identifier, and the error device identifier to the device image processor;
by the device image processor,
obtaining the plurality of device identifiers, the error identifier, and the error device identifier from the device status processor, and
sending the plurality of obtained device identifiers, the error identifier, and the error device identifier to the device image module;
by the device image module,
receiving the plurality of device identifiers, the error identifier, and the error device identifier from the device image processor, reading, from the device configuration definition, a plurality of device image definitions defined with respect to the plurality of received device identifiers, respectively, reading, from the device configuration definition, a plurality of device offset information definitions defined with respect to the plurality of received device identifiers, respectively, sending, to the device image processor, the plurality of read device image definitions and the plurality of read device offset information definitions, reading, from the device configuration definition, a device error definition defined with respect to the received error identifier, reading, from the device configuration definition, an error offset information definition defined with respect to the received error identifier and the received error device identifier, and sending, to the device image processor, the read device error definition and the read error offset information definition; and by the device image processor, receiving the plurality of device image definitions and the plurality of device offset information definitions from the device image module, reading, from the device configuration definition, a plurality of device image parts defined by the plurality of received device image definitions, respectively, receiving, from the device image module, the device error definition and the error offset information definition, reading, from the device configuration definition, an error image part defined by the received device error definition, arranging the plurality of read device image parts on a plurality of offset positions defined by the plurality of received device offset information definitions, respectively, and further arrange the read error image part on an offset position defined by the received error offset information definition, to thereby generate a composite image, and causing the software executing module to display the composite image on the display device;

by the analyzer module analyzing the status information to thereby determine a time at which the error is predicted to occur, and supplying time information to the device status processor, the time information being information indicating the determined time; by the device status processor, receiving the time information from the analyzer module, and supplying the time information to the device image processor; and by the device image processor, obtaining the time information from the device status processor, and generating the composite image including the time information;

by the device image processor, determining whether or not a difference between the time at which the error is predicted to occur and a current time is equal to or larger than a first threshold on a basis of the time information, and generating one composite image in a case where it is determined that the difference is equal to or larger than the first threshold, and generate another composite image different from the one composite image in a case where it is determined that the difference is smaller than the first threshold.

8. The information processing method according to claim 7, further comprising:

by the analyzer module, analyzing the status information to thereby determine that a cause of the error, which is predicted to occur in one of the image forming apparatus and the one or more devices, is solved, and sending, to the device status processor, error solved information indicating that a cause of the error is solved;

by the device status processor, receiving the error solved information from the analyzer module, and supplying the error solved information to the device image processor; and by the device image processor, obtaining the error solved information from the device status processor, then deleting or change the error image part of the composite image to thereby update the composite image, and causing the software executing module to display the updated composite image on the display device.

9. The information processing method according to claim 7, further comprising:

by the analyzer module, analyzing the status information to thereby determine that the error occurred in one of the image forming apparatus and the one or more devices, and sending, to the device status processor, error generated information indicating that the error occurred;

by the device status processor, receiving the error generated information from the analyzer module, and supplying the error generated information to the device image processor; and by the device image processor, obtaining the error generated information from the device status processor, then reading, from the device configuration definition, a different error image part defined by the device error definition received from the device image module, arranging the read different error image part on the offset position to thereby update the composite image, and causing the software executing module to display the updated composite image on the display device.

10. The information processing method according to claim 7, further comprising:

by the analyzer module, making timings of determination of an error, which is predicted to occur in one of the image forming apparatus and the one or more devices, different depending on a past time period from display of the composite image including the error image to solution of a cause of the error.

11. The information processing method according to claim 7, further comprising:

by the analyzer module, determining an error, which is predicted to occur in one of the image forming apparatus and the one or more devices, then sending, to an external device stored in association with the image forming apparatus in the storage device, notification of prediction of the error via the communication interface, and supplying, to the device status processor, error prediction notification information being information indicating that the notification of the prediction of the error is sent;

by the device status processor, receiving the error prediction notification information from the analyzer module, and supplying the error prediction notification information to the device image processor; and by the device image processor, obtaining the error solved information from the device status processor, then deleting or change the error image part of the composite image to thereby update the composite image, and causing the software executing module to display the updated composite image on the display device.

12. The information processing method according to claim 7, wherein the storage device is configured to store the plurality of device configuration definitions, and the plurality of device configuration definitions are in one-to-one association with a plurality of model identifiers, respectively, the plurality of model identifiers identifying a plurality of models of an image forming apparatus, the information processing method further comprising:

by the device image processor, obtaining a model identifier identifying a model of the image forming apparatus as a device identifier identifying the image forming apparatus received from the image forming apparatus by the software executing module, and sending the obtained model identifier to the device image module; and by the device image module, receiving the model identifier from the device image processor, and using a device configuration definition in association with the model identifier.

* * * * *